April 21, 1931.  H. C. STURMAN  1,801,394
ELECTRIC CONDUCTOR SUPPORTING AND INSULATING STRUCTURE
Filed Aug. 28, 1930  3 Sheets-Sheet 1
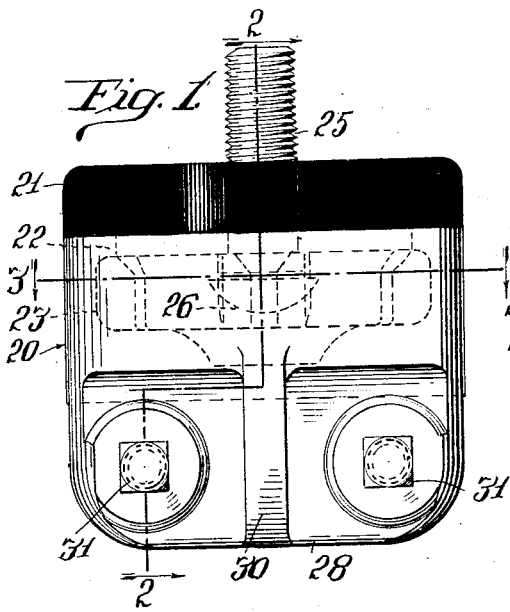
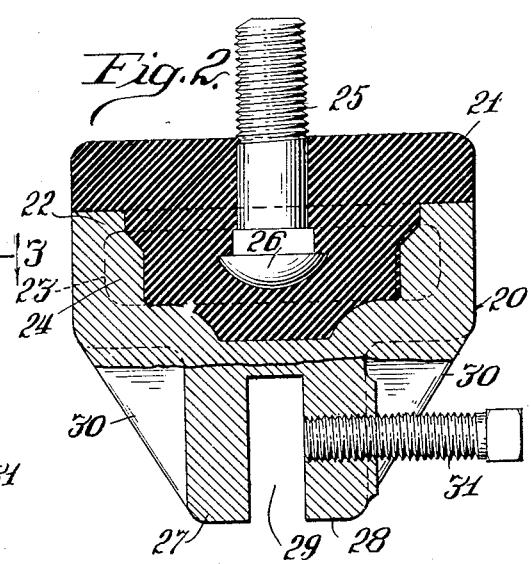
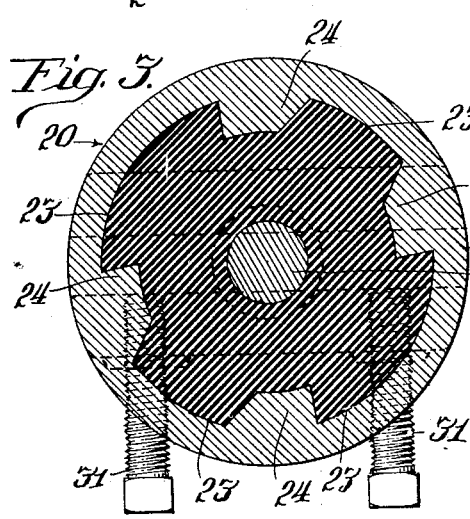
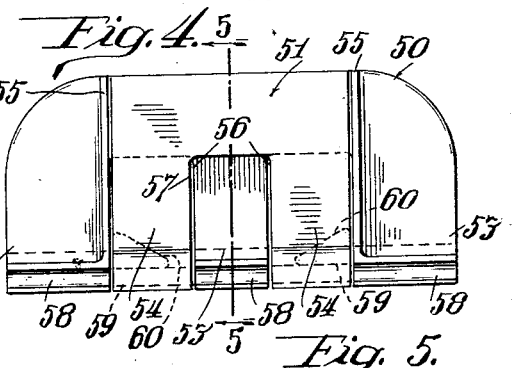
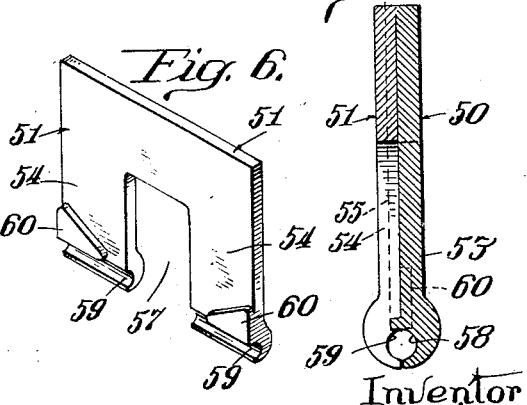
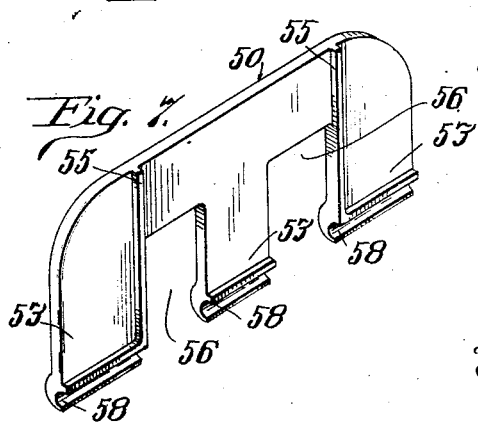
Inventor
Henry C. Sturman
By Thomas H. Ferguson
Attorney.

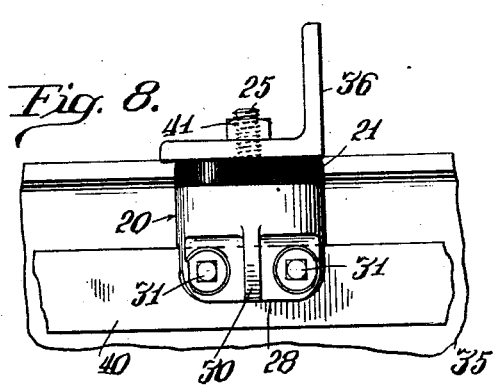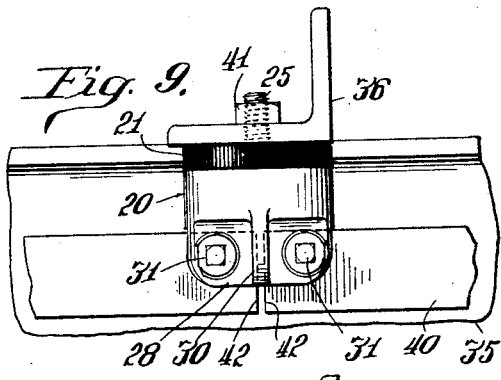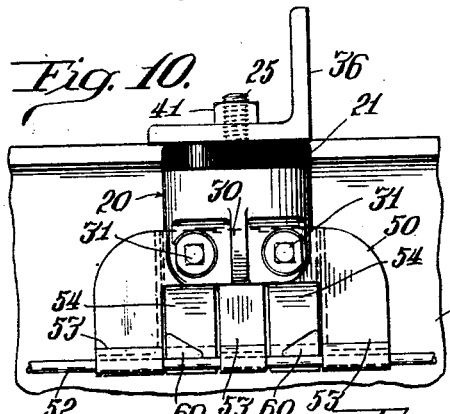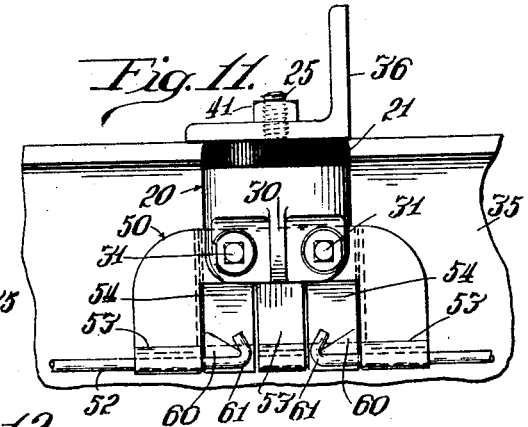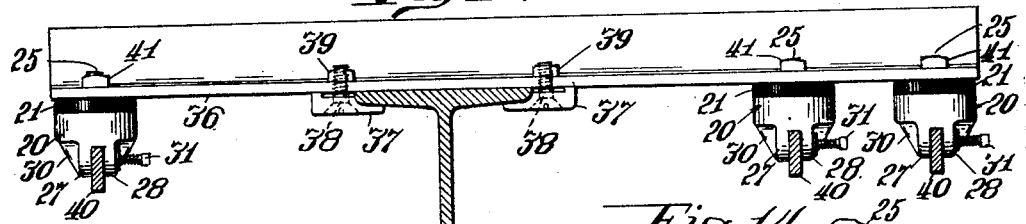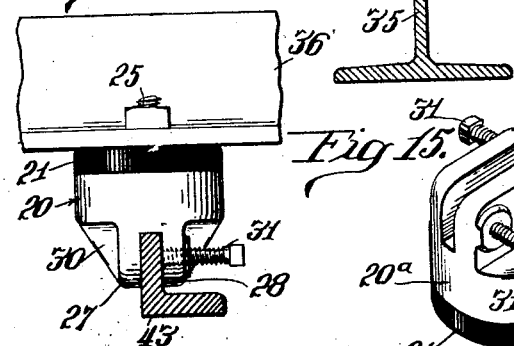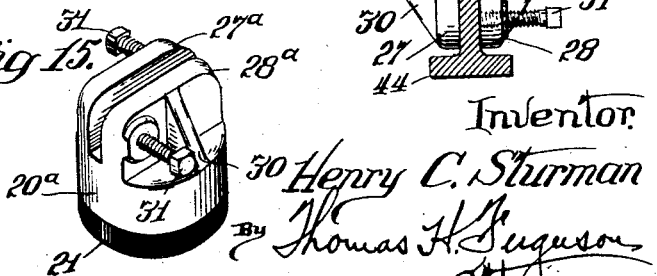

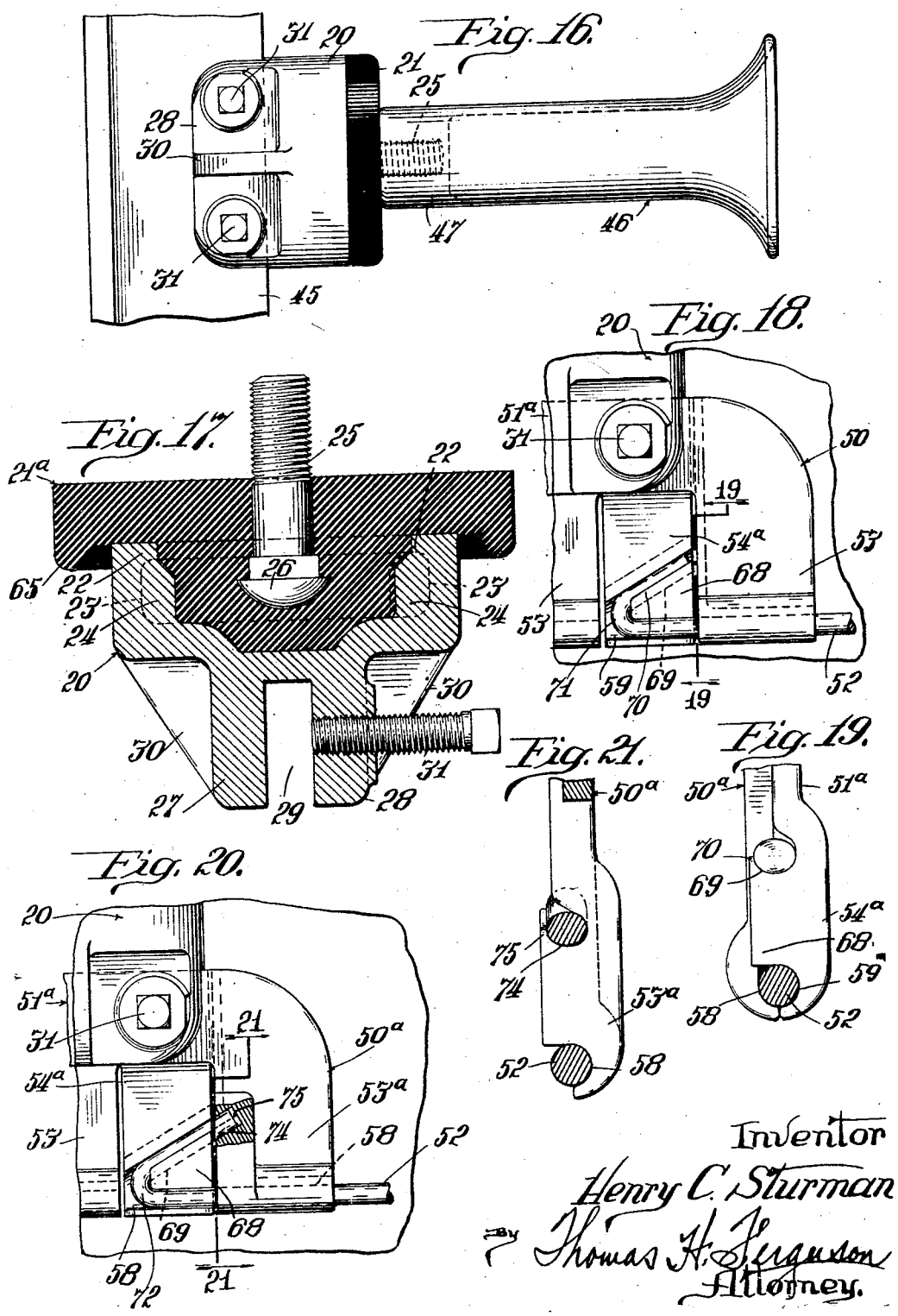

Patented Apr. 21, 1931

1,801,394

UNITED STATES PATENT OFFICE

HENRY C. STURMAN, OF CHICAGO, ILLINOIS

ELECTRIC CONDUCTOR SUPPORTING AND INSULATING STRUCTURE

Application filed August 28, 1930. Serial No. 478,377.

The present invention relates to electric conductor supports and insulators and has for its object to provide a structure of this class wherein there shall be simplicity in construction, economy in manufacture, efficiency in operation in all possible relations and durability in service.

To this end, I have devised an insulator proper which may serve in many relations of parts met with in industrial wiring, in mines, on cranes, on hoists and in other like places, indeed wherever different parts are to to be mechanically connected together and electrically insulated from each other.

The new insulator is capable of supporting bar conductors of different shapes, such as flat bars, T-bars, angle bars, etc. And with my new device it is possible to support these different bars without drilling the conductor bar in order to clamp and support the same. Two clamping, or set, screws with locking nuts securely grip and hold the bar or bars in place.

Besides this, the new insulating device is capable of carrying clamping plates by which bare copper wires may be properly supported and insulated. The new wire clamping plates are also a distinct feature of my invention. By their use it is possible to make all necessary connections without using screws, rivets, or bolts other than the two set screws before mentioned. These serve to hold the plates in place in the insulator proper. These clamping plates are provided with a series of fingers or tongues transversely grooved at their ends and spaced apart so that one set of tongues matches the spaces between the other set of tongues. These tongues engage the wire on opposite sides and firmly hold it in place when the plates are properly fastened.

Another feature is the splicing feature. Two conductor bars may have their ends brought together end to end in the slot of the insulator and be held by the two clamping screws. If but one bar is associated with the insulator, then it passes completely through the slot and the two screws are set up against it. If the two bars abut, then each screw seizes and holds one bar only. Other insulators hold the bars at other points. By the use of my new insulators which splice as well as insulate, the expense of separate splice clamps is avoided.

The splicing feature extends also to the wire supporting plates. By putting nubs or elevations upon the plates, or one of them, at proper points, the ends of the wires may be hooked around the nubs or projections and the wires thus spliced, or a single wire may be passed completely through the device, in both cases the wires resting in the grooves at the ends of the tongues of the plates.

The structure is so arranged that the insulation may be of considerable thickness with the consequent advantage of more completely insulating two mechanically connected metal parts.

The feature of a combined insulator and splice clamp eliminates other fittings which would otherwise be necessary as auxiliaries.

With these preliminary observations as to the nature of the invention, we may now pass to a fuller consideration of the same. For this purpose the following detailed description must be considered in connection with the accompanying drawings which illustrate the preferred embodiments of the invention. The scope of the invention will be set forth in the appended claims.

Fig. 1 of said drawings is a side elevation of an insulator constructed in accordance with the present invention.

Fig. 2 is a vertical section through the same, the plane of section being indicated by the line 2—2 of Fig. 1.

Fig. 3 is a horizontal section through the same, the plane of section being indicated by the line 3—3 of Fig. 1.

Fig. 4 is a side elevation of the wire clamping plates shown is assembled relation.

Fig. 5 is a vertical section through the same, the plane of section being indicated by the line 5—5 of Fig. 4.

Fig. 6 is a perspective view of the smaller of the clamping plates, illustrating particularly the nubs around which the hooks of the wires extend when the device is used for splicing.

Fig. 7 is a perspective view of the larger clamping plate.

Fig. 8 is a side elevation of a complete structure showing the insulator of Fig. 1 supporting a through conductor bar.

Fig. 9 is a similar view illustrating the same insulator connecting and splicing two portions of a bar conductor.

Fig. 10 is a view similar to Fig. 8 illustrating the wire clamping plates added and a through wire conductor in assembled relation.

Fig. 11 is a similar view illustrating the same parts except that the through conductor is replaced by two wires which are electrically connected and spliced.

Fig. 12 is a partial sectional view illustrating an I-beam and associated cross bar with insulators supporting bar conductors, the arrangement being one suited to hoists of the mono-rail type.

Fig. 13 is an elevation of a portion of a cross bar with the associated insulator supporting a conductor bar of angle formation.

Fig. 14 is a similar view illustrating a T-bar conductor.

Fig. 15 is a perspective view of the insulator of Fig. 1 showing a modified screw arrangement.

Fig. 16 is an elevation illustrating an application of the insulator wherein the connections are reversed over the previous figures, the threaded stem securing a trolley supporting finger, and the opposite end of the insulator being connected to the supporting structure.

Fig. 17 is a vertical section, similar to Fig. 2, illustrating a modified insulating member provided with an overhanging petticoat.

Fig. 18 is a side elevation of a portion of a modified wire clamping plate assembly.

Fig. 19 is a vertical elevation of portions of said modified clamping plate and an associated wire, the wire being sectioned and the parts viewed as indicated by the line 19—19 and associated arrows of Fig. 18.

Fig. 20 is a side elevation, similar to Fig. 18, of a second modified plate structure, with a portion of one of the plate tongues broken away and shown in vertical section through the axis of the associated wire end.

Fig. 21 is a vertical elevation, similar to Fig. 19, of said second modified clamping plate and an associated wire, the latter and a portion of the plate being sectioned upon a plane indicated by the line 21—21 of Fig. 20.

Throughout these views like characters refer to like parts.

Referring to said drawings in detail, 20 designates a cupped body of metal. This is the chief metal element of the insulator. Co-operating with this element is the element 21 which is composed of insulating material of great dielectric strength. Bakelite is a good material out of which to make the element 21. This is particularly true because the parts 20 and 21 must be mechanically united so that they act mechanically as a single piece. Bakelite and such substances are at first in the form of a powder, or in comminuted condition, so that they may be readily placed in a mold, and then they are compressed and heated to give them their final shape.

In the present instance, the interior of the cup of the member 20 is provided with an inwardly overhanging flange 22 which extends all around the rim of the cup and provides beneath it a series of peripheral recesses 23. There would be but one recess were it not for the fact that at intervals there are projections 24 which break up the one recess into a plurality of recesses. These vertical projections 24 hold the parts 20 and 21 against relative rotation about the axis of the insulator. The overhanging flange 22, providing the recesses 23, brings about a lock against the separation of the elements 20 and 21 in the direction of the axis of the insulator.

The center of the insulating head 21 serves as a support for a metal stem 25 which is ordinarily in the form of a bolt having an outer threaded end and a head 26 embedded in the insulating member 21. As clearly shown, the metal of the stem 25 and head 26 are spaced a considerable distance from the metal of the body 20, and that space is filled with the insulating material of the head 21. Consequently, the insulating properties of the structure are very great. The stem 25 will, of course, be placed in the powdered compound before it is treated to form the insulating head 21. Consequently the treating of the powdered substance molds and hardens the same about the stem 25 and its head 26 at the same time it is being compressed and hardened within the recesses 23 of the body 20. The arrangement is such that the head 21 entirely covers the open end of the cupped member 20, the periphery of the head 21 extending throughout the full size of the member 20, and being finished off with it into an attractive cylindrical surface, one portion of which is metal and the other portion, the insulating compound.

The body 20 below the cupped portion is provided with two parallel flanges 27, 28 which are spaced apart to provide an intervening slot 29. This slot is preferably in alignment with the stem 25 as shown but extends transversely to it. Each of the flanges 27 and 28 is mechanically strengthened by a beveled reinforced rib 30. The flange 28 has threaded openings near its ends through which the clamping or set screws 31 are adapted to pass.

The outer ends of these screws are preferably headed so that they may be tightly turned by a wrench in order to set the screws against the bar or other object placed in the slot 29.

It seems clear that the set screws 31 might be threaded one through each flange instead of both through the same flange. This modification is shown in Fig. 15. There the flanges are modified so that each, designated 27ᵃ and 28ᵃ, has a threaded opening for a screw 31. In some instances these screw arrangements might be preferred over that where both screws pass through the same flange. The cup member, having the modified flanges 27ᵃ and 28ᵃ, is designated 20ᵃ.

Applications of the insulator thus far described are numerous. In the usual monorail hoist, the hoist travels along the lower flange of an I-beam, such as the I-beam 35, and cross-bars 36, usually angle bars, are secured to the upper flange of the I-beam by means of clips 37, bolts 38 and nuts 39, the bolts passing through suitable openings in one web or arm of the angle bar. At appropriate distances from the I-beam 35, holes are provided for the insulators which are to carry the conductor bars. In Fig. 12 three conductor bars 40 are shown supported by three insulators of the construction heretofore described. In each case the stem 25 passes upward through the opening in the flange of the cross-bar 36 and is provided at its upper end with a nut 41 which is screwed down tightly so as to firmly attach the insulator. The conductor bar is placed in the slot 29 of the insulator and held therein by the clamping screws 31.

As shown in Fig. 8, the bar 40 extends completely through the slot of the insulator and the latter does not serve as a splicing device, since splicing is unnecessary. But in Fig. 9 two conductors 40 are shown with their ends 42 abutting or closely approaching each other. Here the insulator serves as a splicer. One screw 31 engages one of the conductors 40 and the other screw 31 engages the other conductor. The distant portions of these conductors will, of course, be supported by other insulators on other cross-bars upon the I-beam 35 as usual.

Obviously, the conductors 40 may give place to an angle bar conductor 43 or a T-bar conductor 44, as shown in Figs. 13 and 14, respectively. In like manner the insulator may find another application wherein, so to speak, its connections are reversed. Such an application is shown in Fig. 15. There the flanges 27 and 28 embrace the flange or arm of a supporting angle bar 45 and the set screws 31 secure the insulator to the angle bar. In this instance the other end of the insulator, namely that having the stem 25 is connected to a trolley wire support 46, a well known construction, the stem 25 being screwed into a threaded opening in the base of 47 of the support 46.

Passing now to the more complete structure devised for the support of wire conductors in contrast with bar conductors, it may be pointed out that the structure heretofore described is used in substantially the same way as shown in Figs. 8, 9 and 12, but the conductor bar gives place to a pair of clamping plates 50 and 51 which in turn support the conductor wire 52. The plate 50 is provided with three portions in the form of tongues or fingers 53 and the plate 51 is provided with two such portions in the form of tongues or fingers 54. The longer plate 50 has two ribs 55 projecting from one side which serve as guides or stops for the accurate positioning of the shorter plate 51 upon the plate 53. When these parts are properly positioned, the ends of the plate 51 lie just inward of the ribs 55 as clearly illustrated in Fig. 4, and the tongues 54 lie in the slots 56 between the tongues 53 upon the plate 50, the central tongue 53 of plate 50 meanwhile occupying the slot 57 between the tongues 54 of plate 51. The lower ends of the fingers 53 are provided with grooves 58 which project from one side of the plate, in the instance shown, from that side which carries the ribs 55. In like manner the tongues 54 are provided with grooves 59. These grooves, however, are arranged so as to lie on the opposite side of the wire from the grooves 58. In other words, when the plates 50 and 51 are properly assembled, the grooves 59 face toward that side of the plate 50 which does not carry the ribs 55. Thus, the two plates are arranged to engage the conductor wire on opposite sides.

In assembling for a through conductor wire, it is only necessary to place the grooves 58 and 59 on opposite sides of the wire 52 with the plates assembled as shown in Fig. 4, and then pass the two plates into the slot 29 of the associated insulator. These plates will just about fill the slot but will leave enough room for their easy entrance. When the screws 31 are screwed down upon the assembled plates 50 and 51 they will be held firmly together and the wire resting in the grooves 58 and 59 will be properly supported and insulated. A through wire so supported in the through grooves is illustrated in Fig. 10.

When it comes to using the plates 50 and 51 as a splicing device then it becomes necessary to provide nubs or projections such as the projections 60 upon the plate 51, around which the ends of the pieces of wire 52 to be spliced may be bent or hooked, as indicated at 61 in Fig. 11.

Obviously, the insulating portion of the complete insulator may be varied in shape and dimensions. As illustrative of this, I have shown in Fig. 17 a modified insulating member 21ª which is like the member 21 but has an upper face of greater transverse dimension and a peripheral depending petticoat or skirt 65 which improve the insulating properties of the device, first, by increasing the surface distance between the stem 25 and the body 20 and, second, by increasing the surface distance between the body 20 and the outer cylindrical surface of the head which may be exposed to the weather and sometimes carry a film of conducting moisture.

Other modifications relating to the securing of the ends of the wires 52 when spliced after the manner illustrated in Fig. 11 may be employed in many cases to advantage. As illustrative of what may be done in this direction, we have the arrangements shown in Figs. 18 to 21 inclusive. In these figures the plates 50ª and 51ª are similar to the plates 50 and 51 in that they have the same general shape and fit together in the same way. These plates, however, are provided for the better securing of the bent ends of the wires 52.

In the case of the plate 51ª, the tongues 54ª have thickened portions or nubs 68 which, because of the more material available, may be cut away on their upper sides to provide grooves or pockets 69 for the reception of the bent ends of the wires. Each groove 69 is preferably in alignment with the main portion of the wire 52 as clearly shown in Fig. 19. Each projection 68 extends along the edge of the groove so as to provide a sort of retaining hook or ledge 70 which firmly holds the end of the bent wire against dislodgement when the same is drawn tight by the tension of the suspended wire 52.

In order to adapt the wire to this structure it is provided with a bent end 71 which is somewhat longer than the bent end 61 of the previous fingers and is inclined at an angle so as to snugly fit within the groove 69 when the wire is drawn taut without having its end extend beyond the tongue 54ª of the plate 51ª.

In the arrangement of Fig. 18, the plate 51ª is the only changed plate, and then only the tongues are changed. As shown in this figure, this modified plate 51ª is associated with the plate 50. However, the same may be used with the modified plate 50ª which like the plate 51ª is modified only in respect of its tongues, and in this case only in respect of the outer or extreme tongues. This latter construction is shown in Figs. 20 and 21.

Returning now to a consideration of the wire 52, it will be seen that in Fig. 20 the same is given a bend which provides an end 72 somewhat longer than the end 71. This end, like the end 71, also fits into the groove 69 but it projects beyond the tongue 54ª into position to engage a portion of the tongue 53ª of the plate 50ª.

This brings us to a consideration of the tongue 53ª which is similar to the tongue 53 but thickened so as to provide material for a second groove or pocket 74 similar to the groove 69 and having a retaining hook or ledge 75 at its opening. Since the tongues 53ª and 54ª are oppositely disposed the end 72 will rest in the groove 69 on one side of the tongue 54ª and in the groove 74 on the other side of the tongue 53ª. This, of course, will be the location when the wire 52 is drawn so as to bring the hooked end 72 into final position. Of course the entrances to the grooves 69 and 74 are wide enough to properly receive the end when the parts are being assembled.

Obviously, in carrying out my invention still other alterations and modifications may be made in the structure herein disclosed without departing from the spirit and scope of my invention. I, therefore, do not wish to be limited to the details given but aim to cover by the terms of the appended claims all those alterations and modifications which rightly come within said spirit and scope.

What I claim as new and desire to secure by a patent of the United States is:

1. An electric conductor supporting and insulating structure comprising a support having a flat face provided with an opening, a head of insulating material having a flat face adapted to firmly engage the flat face of said support, a cupped metal body filled with the insulating material of said head and separated by said material from said support throughout the entire area of the cup, said cupped body and insulating material being integrally united, a threaded stem planted in said material and insulated thereby from said body, said stem extending beyond, and at substantially right angles to, the plane of the face of said head into the opening in said support, means for firmly securing said stem and support together with said stem extending through said opening and with said flat faces in engagement, parallel flanges on the side of said cupped body away from said support, said flanges being spaced to provide a central longitudinal slot extending transversely of the axis of said stem, and a pair of set screws threaded through flange openings to engage and hold an object placed in said slot.

2. An insulating and supporting device comprising a head of insulating material having a flat face adapted to engage the flat surface of a part to be connected by said device, a cupped metal body filled with the insulating material of said head and separated by said material from the part secured against said flat face throughout the full area of the cup, said cupped body and insulating material being integrally united, a threaded stem planted within said cup in said material but spaced from said body and insulated therefrom, said stem extending beyond, and at substantially right angles to, the plane of the flat face of said head to serve as a connecting means for attachment of that part which is to engage said flat face, parallel flanges on the side of said cupped body away from said head of insulating material, said flanges being spaced to provide a central slot extending transversely of the axis of said stem, and a pair of set screws threaded through flange openings to relatively fix said device and an object fitted into said slot.

3. An electric conductor supporting and insulating structure comprising a support having a flat face provided with an opening, a head of insulating material having a flat face adapted to firmly engage the flat face of said support, a cupped metal body filled with the insulating material of said head and separated by said material from said support throughout the entire area of the cup, said cupped body and insulating material being integrally united, a threaded stem planted in said material and insulated thereby from said body, said stem extending beyond, and at substantially right angles to, the plane of the face of said head into the opening in said support, means for firmly securing said stem and support together with said stem extending through said opening and with said flat faces in engagement, parallel flanges on the side of said cupped body away from said support, said flanges being spaced to provide a central longitudinal slot extending transversely of the axis of said stem, two conductor bars abutting end to end in said slot, and a pair of set screws threaded through flange openings into holding contact with said bars, respectively.

4. An electric conductor supporting and insulating structure comprising a support having a flat face provided with an opening, a head of insulating material having a flat face adapted to firmly engage the flat face of said support, a cupped metal body filled with the insulating material of said head and separated by said material from said support throughout the entire area of the cup, said cupped body and insulating material being integrally united, a threaded stem planted in said material and insulated thereby from said body, said stem extending beyond, and at substantially right angles to, the plane of the face of said head into the opening in said support, means for firmly securing said stem and support together with said stem extending through said opening and with said flat faces in engagement, parallel flanges on the side of said cupped body away from said support, said flanges being spaced to provide a central longitudinal slot extending transversely of the axis of said stem, two overlapping clamping plates positioned in said slot, and a pair of set screws threaded through flange openings into holding contact with said clamping plates, each of said plates having a plurality of spaced tongues extending outward from said slot, the tongues of one plate fitting into the spaces of the other, each set of tongues having grooves oppositely arranged on the two plates to hold a conductor wire therebetween.

5. An electric conductor supporting and insulating structure comprising a support having a flat face provided with an opening, a head of insulating material having a flat face adapted to firmly engage the flat face of said support, a cupped metal body filled with the insulating material of said head and separated by said material from said support throughout the entire area of the cup, said cupped body and insulating material being integrally united, a threaded stem planted in said material and insulated thereby from said body, said stem extending beyond, and at substantially right angles to, the plane of the face of said head into the opening in said support, means for firmly securing said stem and support together with said stem extending through said opening and with said flat faces in engagement, parallel flanges on the side of said cupped body away from said support, said flanges being spaced to provide a central longitudinal slot extending transversely of the axis of said stem, two overlapping clamping plates positioned in said slot, a pair of set screws threaded through flange openings into holding contact with said clamping plates, each of said plates having a plurality of spaced tongues extending outward from said slot, the tongues of one plate fitting into the spaces of the other, each set of tongues having grooves oppositely arranged on the two plates to hold conductor wires therebetween, and retaining projections on said tongues for engaging the hooked ends of said conductor wires to splice the same and electrically connect them.

6. An insulating and supporting device comprising a head of insulating material having a flat face adapted to engage the flat surface of a part to be connected by said device, a cupped metal body filled with the insulating material of said head and separated by said material from the part secured against said flat face throughout the full area of the cup, said cupped body and insulating material being integrally united, a threaded stem planted within said cup in said material but spaced from said body and insulated therefrom, said stem extending beyond, and at substantially right angles to, the plane of the flat face of said head to serve as a connecting means for attachment of that part which is to engage said flat face, parallel flanges on the side of said cupped body away from said head of insulating material, said flanges being spaced to provide a central slot extending transversely of the axis of said stem, two overlapping clamping plates positioned in said slot, and a pair of set screws threaded through flange openings into holding contact with said clamping plates, each of said plates having a plurality of spaced tongues extending outward from said slot, the tongues of one plate fitting into the spaces of the other, each set of tongues having grooves oppositely arranged on the two plates to receive a conductor wire therebetween.

7. An insulating and supporting device comprising a head of insulating material having a flat face adapted to engage the flat surface of a part to be connected by said device, a cupped metal body filled with the insulating material of said head and separated by said material from the part secured against said flat face throughout the full area of the cup, said cupped body and insulating material being integrally united, a threaded stem planted within said cup in said material but spaced from said body and insulated therefrom, said stem extending beyond, and at substantially right angles to, the plane of the flat face of said head to serve as a connecting means for attachment of that part which is to engage said flat face, parallel flanges on the side of said cupped body away from said head of insulating material, said flanges being spaced to provide a central slot extending transversely of the axis of said stem, two overlapping clamping plates positioned in said slot, a pair of set screws threaded through flange openings into holding contact with said clamping plates, each of said plates having a plurality of spaced tongues extending outward from said slot, the tongues of one plate fitting into the spaces of the other, each set of tongues having grooves oppositely arranged on the two plates to receive conductor wires therebetween, and retaining projections on said tongues for engaging the hooked ends of said conductor wires to splice the same and electrically connect them.

8. An electric conductor supporting and insulating structure comprising a support having a flat face provided with an opening, a head of insulating material having a flat face adapted to firmly engage the flat face of said support, a cupped metal body filled with the insulating material of said head and separated by said material from said support throughout the entire area of the cup, said cupped body and insulating material being integrally united, a threaded stem planted in said material and insulated thereby from said body, said stem extending beyond, and at substantially right angles to, the plane of the face of said head into the opening in said support, means for firmly securing said stem and support together with said stem extending through said opening and with said flat faces in engagement, parallel flanges on the side of said cupped body away from said support, said flanges being spaced to provide a central longitudinal slot extending transversely of the axis of said stem, two overlapping clamping plates positioned in said slot, and a pair of set screws threaded through flange openings into holding contact with said clamping plates, each of said plates having a plurality of spaced tongues extending outward from said slot, the tongues of one plate fitting into the spaces of the other, each set of tongues having grooves oppositely arranged on the two plates to hold a conductor wire therebetween, two nubs projecting laterally from one of said clamping plates at points adjacent to said grooves, and two conductor wires extending toward each other in said grooves and each being bent around one of said nubs, thereby splicing the wire as well as supporting and insulating it.

9. An insulating and supporting device comprising a head of insulating material having a flat face adapted to engage the flat surface of a part to be connected by said device, a cupped metal body filled with the insulating material of said head and separated by said material from the part secured against said flat face throughout the full area of the cup, said cupped body and insulating material being integrally united, a threaded stem planted within said cup in said material but spaced from said body and insulated therefrom, said stem extending beyond, and at substantially right angles to, the plane of the flat face of said head to serve as a connecting means for attachment of that part which is to engage said flat face, parallel flanges on the side of said cupped body away from said head of insulating material, said flanges being spaced to provide a central slot extending transversely of the axis of said stem, two overlapping clamping plates positioned in said slot, and a pair of set screws threaded through flange openings into holding contact with said clamping plates, each of said plates having a plurality of spaced tongues extending outward from said slot, the tongues of one plate fitting into the spaces of the other, each set of tongues having grooves oppositely arranged on the two plates to receive a conductor wire therebetween.

10. An electric conductor supporting and insulating structure comprising a support having a flat face provided with an opening, a head of insulating material having a flat face adapted to firmly engage the flat face of said support, a cupped metal body filled with the insulating material of said head and separated by said material from said support throughout the entire area of the cup, said cupped body and insulating material being integrally united, a threaded stem planted in said material and insulated thereby from said body, said stem extending beyond, and at substantially right angles to, the plane of the face of said head into the opening in said support, means for firmly securing said stem and support together with said stem extending through said opening and with said flat faces in engagement, parallel flanges on the side of said cupped body away from said support, said flanges being spaced to provide a central longitudinal slot extending transversely of the axis of said stem, two overlapping clamping plates positioned in said slot, and a pair of set screws threaded through flange openings into holding contact with said clamping plates, each of said plates having a plurality of spaced tongues extending outward from said slot, the tongues of one plate fitting into the spaces of the other, each set of tongues having grooves oppositely arranged on the two plates to hold a conductor wire therebetween, two grooved nubs projecting laterally from the tongues of one of said clamping plates at points adjacent to said grooves, the end tongues of the other of said clamping plates being shaped to receive the ends of conductor wires, and two conductor wires extending toward each other in said grooves and each being bent around one of said nubs, and extending beyond the tongues of said one plate into engagement with the tongues of said other plate, thereby splicing the wire as well as supporting and insulating it.

11. An insulating and supporting device comprising a head of insulating material having a flat face adapted to engage the flat surface of a part to be connected by said device, a cupped metal body filled with the insulating material of said head and separated by said material from the part secured against said flat face throughout the full area of the cup, said cupped body and insulating material being integrally united, a threaded stem planted within said cup in said material but spaced from said body and insulated therefrom, said stem extending beyond, and at substantially right angles to, the plane of the flat face of said head to serve as a connecting means for attachment of that part which is to engage said flat face, parallel flanges on the side of said cupped body away from said head of insulating material, said flanges being spaced to provide a central slot extending transversely of the axis of said stem, two overlapping clamping plates positioned in said slot, and a pair of set screws threaded through flange openings into holding contact with said clamping plates, each of said plates having a plurality of spaced tongues extending outward from said slot, the tongues of one plate fitting into the spaces of the other, each set of tongues having grooves oppositely arranged on the two plates to receive a conductor wire therebetween, and means on both of said plates for securing the bent ends of two conductor wires against rotation and separation when drawn apart as in service.

12. An electric conductor supporting and insulating structure comprising a support, long and short clamping plates having overlapping portions and interfitting non-overlapping tongue portions, and means for securing said plates to said support at said overlapping portions, the non-overlapping tongue portions having oppositely disposed through grooves for engaging the opposite sides of a through wire conductor carried and supported thereby, said non-overlapping tongue portions of one of said plates having nubs grooved on their edges to receive the bent ends of conductor wires electrically and mechanically connected by said plates.

13. An electric conductor supporting and insulating structure comprising a support, long and short clamping plates having overlapping portions and interfitting non-overlapping tongue portions, and means for securing said plates to said support at said overlapping portions, the non-overlapping tongue portions having oppositely disposed through grooves for engaging the opposite sides of a through wire conductor carried and supported thereby, the non-overlapping tongue portions of said short clamping plate having nubs grooved on their edges and the non-overlapping tongue portions of said long clamping plate having pockets, the said grooves and pockets engaging respectively different portions of the bent ends of conductor wires electrically and mechanically connected by said clamping plates.

14. An electric conductor supporting and insulating structure comprising a support, long and short clamping plates having overlapping portions and interfitting non-overlapping tongue portions, and means for securing said plates to said support at said overlapping portions, the non-overlapping tongue portions having oppositely disposed through grooves for engaging the opposite sides of a through wire conductor carried and supported thereby, said non-overlapping tongue portions of one of said plates having nubs grooved on their inner edges, and two conductor wires extending toward each other in said through grooves and each being bent about one of said nubs so as to rest in the groove thereof, the wires being thereby spliced as well as supported and insulated.

15. An electric conductor supporting and insulating structure comprising a support, long and short clamping plates having overlapping portions and interfitting non-overlapping tongue portions, and means for securing said plates to said support at said overlapping portions, the non-overlapping tongue portions having oppositely disposed through grooves for engaging the opposite sides of a through wire conductor carried and supported thereby, the non-overlapping tongue portions of said short clamping plate having nubs grooved on their edges and the non-overlapping tongue portions of said long clamping plate having pockets, and two conductor wires extending toward each other in said through grooves and each being bent about one of said nubs so as to rest in the groove thereof and passing beyond said short plate into one of the pockets of the tongue portions of said long clamping plate, the wires being thereby spliced as well as supported and insulated.

HENRY C. STURMAN.